Sept. 8, 1970 R. M. SEIDEN 3,528,077
EQUAL SPACE LINE DIVIDER AND METHOD OF MAKING THE SAME
Filed March 29, 1968 3 Sheets-Sheet 1

RICHARD M. SEIDEN
INVENTOR.

BY Popper Bain + Bobis
Attys

Sept. 8, 1970  R. M. SEIDEN  3,528,077
EQUAL SPACE LINE DIVIDER AND METHOD OF MAKING THE SAME
Filed March 29, 1968  3 Sheets-Sheet 2
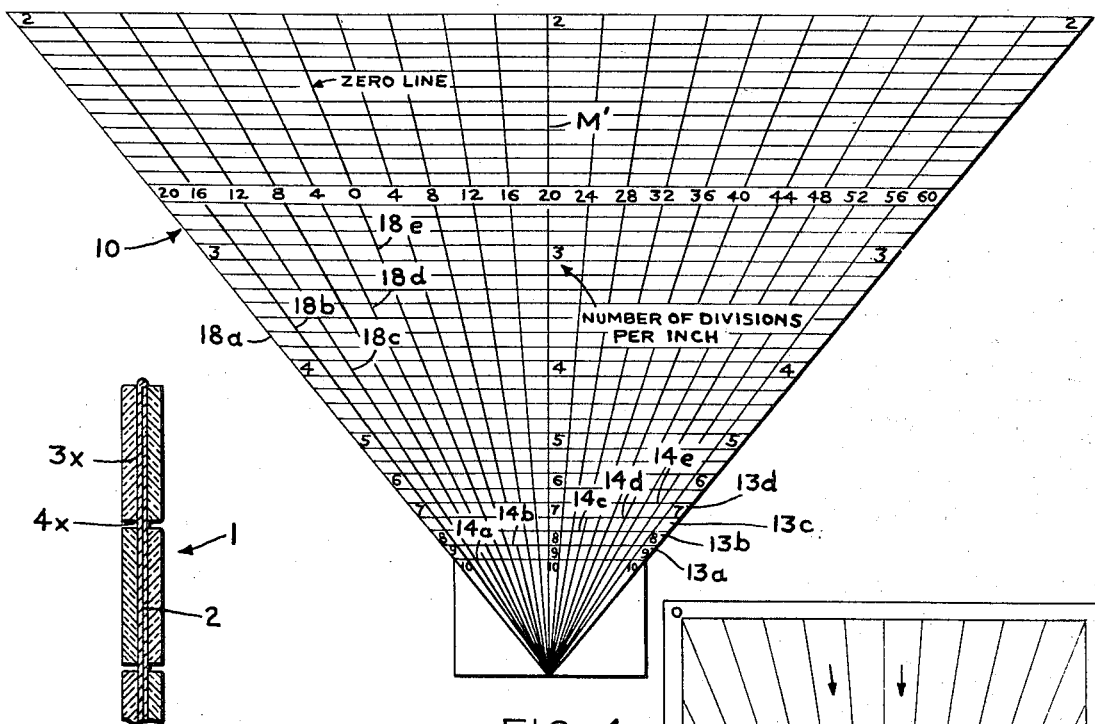
FIG. 4
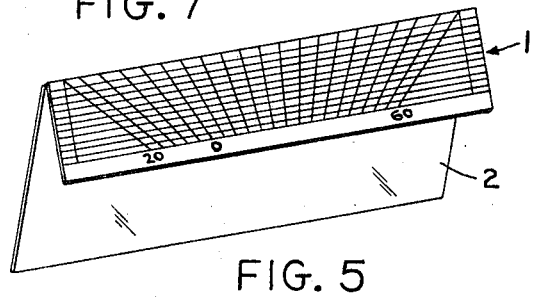
FIG. 7
FIG. 5
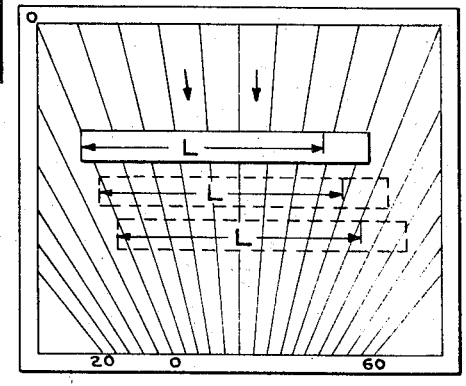
FIG. 8
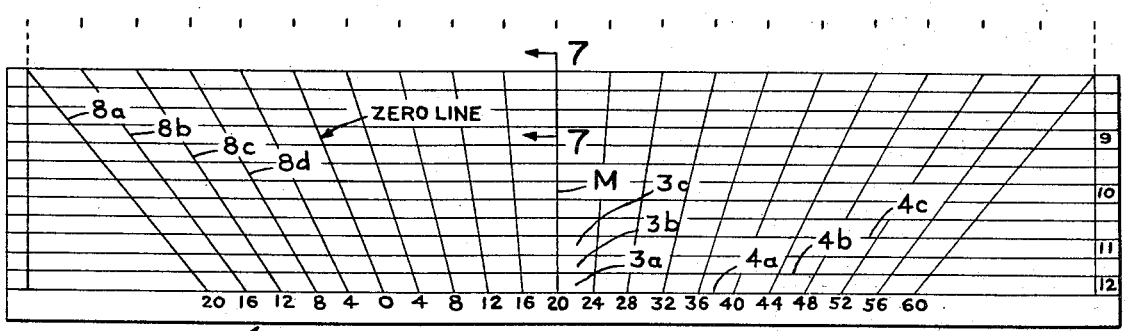
FIG. 6
RICHARD M. SEIDEN
INVENTOR
BY Popper Bain & Bobis
attys Sept. 8, 1970   R. M. SEIDEN   3,528,077
EQUAL SPACE LINE DIVIDER AND METHOD OF MAKING THE SAME
Filed March 29, 1968   3 Sheets-Sheet 3

RICHARD M. SEIDEN
INVENTOR
BY Popper Bain + Bobis
ATTYS

United States Patent Office 3,528,077
Patented Sept. 8, 1970

3,528,077
EQUAL SPACE LINE DIVIDER AND METHOD
OF MAKING THE SAME
Richard M. Seiden, 47 Glendale Ave.,
Livingston, N.J. 07039
Filed Mar. 29, 1968, Ser. No. 717,080
Int. Cl. B43l 5/00
U.S. Cl. 33—1                                            10 Claims

ABSTRACT OF THE DISCLOSURE

A device for dividing a line or space into an equal number of parts which employs at least two interrelated layers or members consisting of a base member of flexible or pliable material and a plurality of relatively stiff elements, strips or segments, having parallel edges and arranged parallel to each other and so affixed to the base member as to permit the formation of a joint between any two given strips or segments, when the base member is bent or folded; the strip or segmented elements being marked or imprinted with lines or calibration marks in a predetermined geometrical and spatial relation so that at any joint so formed a pre-determined number of equal parts may be measured by reference to the corresponding number of imprinted lines or calibration marks on the adjacent visible strip or segment element for the given joint.

PRIOR ART

Various mechanical devices are known for dividing a line into any given number of equal spaces.

Generally these devices are expensive and must be handled carefully to preserve and to retain their precision.

Less complex devices have been developed for this purpose such as is shown in U.S. Pats. 2,589,525; 2,547,-745 and 1,155,059 and in British Pat. 3,990 of 1855.

SUMMARY OF THE INVENTION

The present invention provides a less complex and relatively simple device for dividing a line or space into a given number of equal spaces and comprises in its simplest form at least a flexible or pliable base member; a plurality of relatively stiff strips or segments having parallel edges affixed to said base member in juxtaposition to each other to permit a joint to be formed therebetween by bending the base member; and said strip or segments imprinted with an interrelated plurality of diverging lines or calibration marks transverse to said parallel edges and at predetermined spaced intervals to each other to provide predetermined measuring units for any given joint thus formed.

Accordingly, it is an object of the present invention to provide an improved instrument or device to facilitate the division of a line into a desired number of equal parts.

It is another object of the present invention to provide an instrument or device which uses a plurality of strips having parallel edges and means imprinted transverse and divergent to said edges to delineate a predetermined number of sub-divisions at each edge to enable a given strip to coact with a line or space to divide the same into the number of parts corresponding to the imprinted sub-divisions at the parallel edge.

It is another object of the present invention to provide an equal spacing line divider which is relatively cheap, simple to use and capable of use generally by engineers, draftsmen, chartists, mechanics and machine operators for a variety of functions and purposes which may require lines or spaces to be sub-divided into equal parts.

Other objects, advantages and related applications and forms of this device will become apparent to those skilled in this art, from the description of the embodiments of the present invention and method of making the same as illustrative in the accompanying drawings, wherein:

FIG. 4 shows another form of the invention in triangular form with the origin point for the calibration lines on the device itself.

FIG. 5 illustrates the upper portion of an instrument in accordance with FIG. 1 as it is being folded on itself.

FIG. 6 shows the folded instrument in accordance with FIG. 1 as applied to a line to be marked.

FIG. 7 is a section taken on line 7—7 of FIG. 6 to show a section of the folded joint.

FIG. 8 illustrates the use of an equal space line divider in accordance with the FIG. 1 form of the invention coacting with a ruler for locating the desired spacing.

Figure 1:
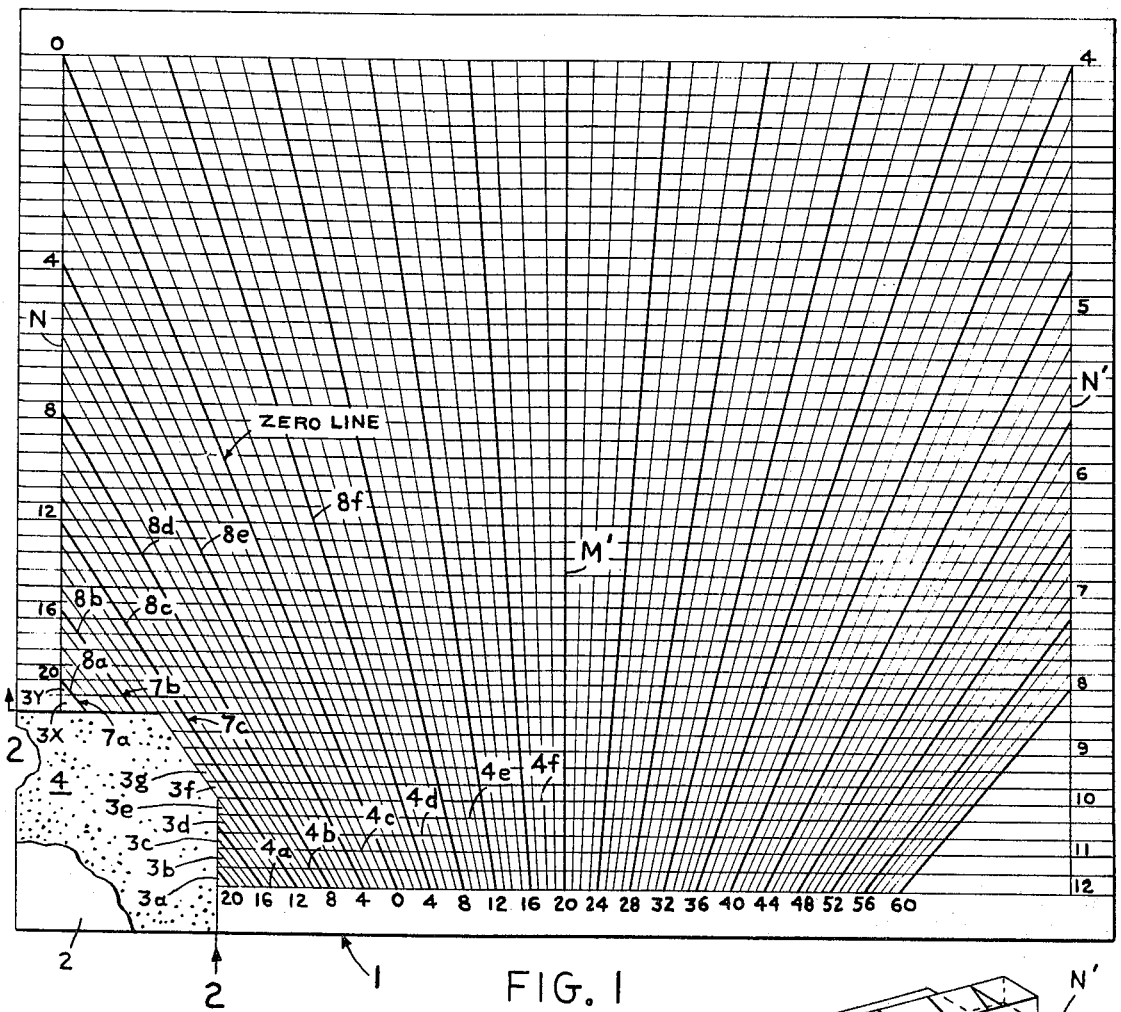
FIG. 1 is a plan view of one form of the present invention broken away in part to show the respective layers of material of which the device is made in accordance with the present invention.

Referring to the drawings, FIG. 1 shows one form of equal spacing line divider generally designated 1 in accordance with the present invention as having the calibrating lines more fully described hereinafter on a device having a rectangular shape.

It will be understood that this is merely illustrative and that the device and the calibrating lines may have any suitable or convenient shape such as the triangular form of the invention illustrated at FIG. 4.

However, in whatever form the present invention is made, it will have as hereinafter described imprinted calibrating lines which diverge from a given point either off the instrument as is the case for the FIG. 1 form of the invention or on the instrument as shown in the FIG. 4 form of the invention and the calibrating lines will be spaced in predetermined relation to each other for purposes which will appear clear hereinafter.

Figure 2:
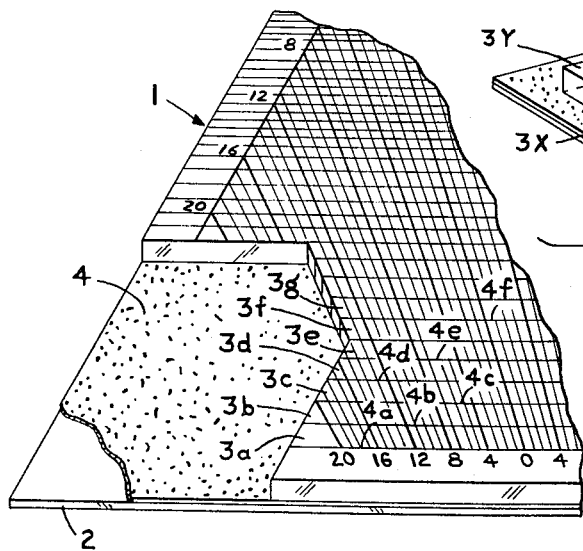
FIG. 2 is an enlarged partial perspective of the device shown in FIG. 1 partly in vertical section along the line 2—2 of FIG. 1.

The equal spacing line divider 1 has a base member 2 and a plurality of calibrating strips or calibrating segments 3a, 3b, 3c, 3d, 3e, 3f and 3g etc., which are affixed or attached to the base member 2 by any suitable manner such as a permanent long life pressure sensitive adhesive generally designated 4 all of which is clearly shown in FIGS. 1 and 2 of the drawings.

BASE MEMBER

The base member 2 is preferably a single unitary layer or member approximately $3 \times 10^{-3}$ in thickness. It may, however, be composed of two or more layers depending on the method of making the equal spacing line divider in accordance with the present invention.

Any suitable relatively thin pliable or flexible material coated on at least one face with the pressure-sensitive adhesive may be utilized for the base member. Relatively thin vinyl and similar plastic materials having pressure sensitive adhesive coatings on one face are adapted to be used as the material for the base member 1 and are sold on the open market under the registered trademarks "Contacs," "Stixs," etc.

These trademarked materials can be bent and folded and have the proper adhesives thereon to enable the calibrating strips or calibrating segments 3, 3a, 3b, 3c, 3d, 3e, 3f and 3x etc., to be affixed and to coact with the base member 1 and with each other to form joints or horizontal indices as at 4a, 4b, 4c, 4d, 4e and 4f to obtain the desired operation and performance of the present device.

CALIBRATING STRIPS

The calibrating strips or calibrating segments 3a, 3b, 3c, 3d, and 3f are substantially identical to each other as to their general construction. Accordingly, one strip or segment will now be described.

Figure 3:
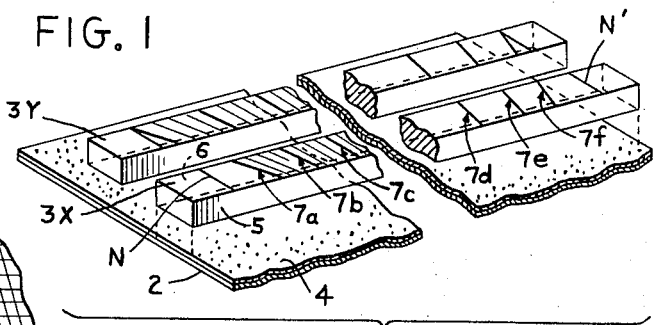
FIG. 3 is an exploded view of two calibrating strips and an associated portion of the flexible base member.

Thus, the calibrating strip 3x shown at FIGS. 1, 2 and 3 of the drawings is an elongated but stiff member.

The stiffness of the calibrating strips or calibrating segments 3a, 3b, 3c, 3d, 3e, 3f and 3x etc., will depend on the material from which they are made and for the present invention this could be paper or cardboard either coated or uncoated or laminated with a plastic coating or it could be a heavy fabric or one or more of the well known plastics such as polymers or resins or any similar materials that are adapted to coact with the base member for the purposes of the present invention.

It is believed fundamental, however, that the stiffness and other characteristics of the material should be such that they can withstand reasonable usage and the thickness should be preferably in the order of $3 \times 10^{-3}$ or about 2 to 3 times the thickness of the flexible base material.

The width of the strip or segment 3x as well as the other strips or segments 3b, 3c, 3d, etc., will be in a range from ¼" to ⅟₁₆" depending on the material used and the degree of precision obtainable when the strips are cut to provide the parallel edges 5 and 6 in the sized width.

When the strips or segments 3a, 3b, 3c, 3d, 3e, 3f and 3x etc., are made of a relatively stiff plastic or the like material, it has been found that precision cuts in a range from ⅛" to ³⁄₁₆" are obtainable and these widths offer a sufficient number of joints between the segments to provide a span of space dividing increments adequate for all regular measuring and calculating problems for which the present instrument is used.

The outer or upper face, i.e., the visible face remote from the face attached or affixed to the base member 1 will have a series of spaced divergent lines 7a, 7b, 7c, 7d, 7e and 7f etc., imprinted, stamped, marked, molded or otherwise placed thereon, which lines are inclined away from one another and form a portion or length of a series of converging or diverging calibration lines generally designated 8a, 8b, 8c, 8d, 8e and 8f etc., as shown on the face of the equal space line dividers in accordance with the present invention at FIG. 1 of the drawings.

In the case of the calibrating strips in the form of the invention shown in FIG. 1 of the drawings, the strips have been shaped so that they do not all lie within the boundaries of the outermost divergent calibrating lines 8a, 8b, 8c, 8d, etc., The calibrating strip 3x has the divergent indicia or markings 7a, 7b, 7c, 7d, 7e, etc., thereon extending across the entire length of the strips.

Where, however, the calibrating strip is not within the extremities of the divergent calibrating lines, this will not occur as is the case with certain of the calibrating strips 3a, 3b, etc., shown at the lower extremity of the form of the invention shown in FIG. 1 of the drawings.

CALIBRATION LINES

The calibration lines 8a, 8b, 8c, 8d and 8e, etc., must be so formed on the face of the equal space line divider of the present invention that the individual joints or horizontal indices progressively provide various increments of equal spaces or divisions either in an arithmetical, geometrical, logarithmic or other mathematical basis from the smallest number of spacings or divisions to the largest number of spacings or divisions within the particular range of any given form of device made in accordance with the present invention.

Each individual joint provides a horizontal index which will always permit measuring on a given line or space the predetermined number of divisions for that joint or horizontal index.

If more or less divisions or spaces are required, then a new joint or horizontal index must be selected by moving upwardly or downwardly on the equal space line divider and then bending the divider at those adjacent calibration strips or segments which will provide the joint or horizontal index desired as indicated at FIG. 5 of the drawings.

In the devices shown at FIG. 1, the calibration lines 8a, 8b, 8c, etc., and at FIG. 4, the calibration lines 18a, 18b, 18c, etc., have been so disposed relative each other as to provide measurements based on a given number of divisions or spaces per inch, for example four spaces per inch, five spaces per inch, eight spaces per inch, etc. Alternatively, the spacing could be set up against a centimeter or other given measurement of length.

In order to achieve this result, the calibration lines are generally imprinted either before the calibration strips or segments are cut or before they are rendered operative to permit the bending operation necessary for forming a given joint or horizontal index between any pair of adjacent calibrating strips or segments.

The calibration lines 8a, 8b, 8c, etc., and 18a, 18b, 18c, etc., will be precisely ruled imprinted marked or otherwise permanently applied to the visible face of the calibrating strips with the origin of each calibrating line commencing at an origin point either off the instrument at an imaginary point relative the instrument and the lines extend radially outward from this origin point as is shown in FIG. 1 or on the instrument as is shown in FIG. 4 of the drawings.

In FIG. 4, the equal space line divider in accordance with the present invention is in the form of a triangular member in which all the segmented strips lie within the converging lines.

Thus, in FIG. 4, the equal space line divider generally designated 10 includes calibration strips 13a, 13b, 13c and 13d etc., which form joints as at 14a, 14b, 14c and 14d etc., identical to those above described for the FIG. 1 form of the invention and the face of the device has diverging lines 18a, 18b, 18c etc., which as indicated above diverge from a Point P on the instrument itself.

As is clear from both FIGS. 1 and 4 of the drawings the plurality of calibration lines will also be equally spaced from each other and will fan out laterally as they extend radial from the origin point. Thus, the calibration lines span a segment of an imaginary circle in which event they take either triangular or pie spaced appearance such as shown in the form of the invention at FIG. 4 or the fragmentary rhomboidal position of a pie shaped segment as is shown in FIG. 1 of the drawings.

So long as the calibration lines are spaced and equidistant from each other, any number of lines can be used between the outer-most calibration lines within the range of practicality for a particular device made in accordance with the present invention.

In either the form of the invention shown in FIG. 1 or 4 of the drawings, it will be noted that there is one calibration line M and M' line designated respectively with the numerical value of 20 in both FIG. 1 and FIG. 4 that extends through the origin point. These lines M and M' are also perpendicular to the horizontal edges of each of the calibrating strips 3a, 3b, 3c, etc., and 13a, 13b, 13c etc.

Along line M' as shown in the form of the invention illustrated at FIG. 4, or parallel to line M as illustrated at lines N and N' at the edge of the calibration lines in the form of the invention shown in FIG. 1, the major indicia on the spacing are designated as an index to facilitate the use of the instrument.

Thus, in the form of the invention shown in FIG. 4, we find running from the top to the bottom of the instrument, along line M' the joint or horizontal index numbers 2, 3, 4, 5 etc. Similarly, on lines N and N' in the form of the invention shown in FIG. 1, these numbers appear on the right and left hand side of the instrument as joint or index numbers 4, 5, 6, 7 etc.

These joints or horizontal index numbers refer to the number of equal spaces per inch. Thus, 2 means 2 spaces per inch; 5 means 5 spaces per inch; 7 means 7 spaces per inch etc.

Each instrument will also be marked to show the number of calibration lines thereon and as indicated, there will be one main or reference line being designated 0 as the zero line and the numerical count will begin from this line. In the form of the invention shown in FIG. 1, the numerical count was done in both directions to increase the number of spaces or divisions available.

Figure 9:
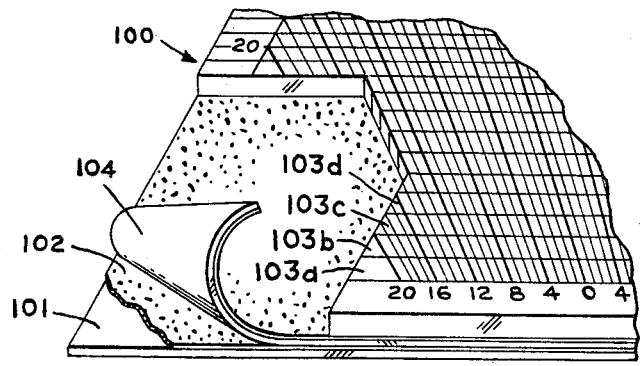
FIG. 9 shows a plan view of another form of the present invention of the type illustrated in FIG. 1 but having at least one intermediate layer.

In FIG. 9, a further form of the invention is shown in which the instrument consists of more than two layers namely that there are two flexible backing layers for reasons which will appear clear by reference to the methods of manufacturing the present device, more particularly described, with reference to FIGS. 12a, 12b, 12c, 12d, 12e and 12f.

Thus, in FIG. 9, the equal space line divider generally designated 100 which is imprinted with calibration lines and indicia identical to that above described for the FIG. 1 form of the invention is shown as including a base member 101 of the pliable or flexible material having at least one face with the desired pressure sensitive adhesive coating 102 thereon, a plurality of calibration strips 103a, 103b, 103c, 103d etc., and an intermediate layer or member 104 which is illustrated as being made of the same type of adhesively coated pliable or flexible material as the base member 101 although it would be understood that the intermediate layer can be a separate coating of adhesive on the back of the calibration strips or coated to the calibration strips without departing from the spirit of this form of the invention.

The calibration strips 103a, 103b, 103c, 103d etc., are connected to the adhesive face of the intermediate member 104 and this combined unit is in turn affixed to the pressure sensitive face of the backing or base member 101.

Except for the addition of the intermediate layer or member 104, this unit is otherwise identical in all respects with the base member 1 and the calibration strips 3a, 3b, 3c, 3x etc., as above described for the form of the invention shown in FIG. 1 of the drawings.

OPERATION

In operation, if it is desired to swiftly and accurately divide in a line into seven equal parts per inch, then any of the instruments above described will be placed so that the index numbers, are readily available.

Thus, for example, the index numbers wlil be to the right in the form of the invention illustrated in FIG. 1.

The instrument is then, folded back on itself as illustrated, in FIGS. 5 and 6, along that joint or horizontal index providing 7 equal parts per inch. Then, the edge which has the calibrating lines 8a, 8b, 8c, 8d, etc., diverging therealong, is held as shown in FIG. 6 of the drawings so that the line to be divided can be marked at the respective equal graduations rperesented by the calibration lines at this joint or horizontal index.

FIG. 7 illustrates the mechanism for utilizing the present device where the desired spacing cannot be conveniently obtained using the general indicia as at 4, 5, 6, and 7 for the joints or horizontal indices.

Where, for example, it is necessary to divide a six inch line or space into 43 parts, it will be necessary to find that joint or horizontal index which will provide the necessary number of equal divisions desired.

This is accomplished by placing the instrument in front of you as illustrated in FIG. 8 of the drawings. Then for convenience a ruler is selected which will have at least six inches marked thereon.

The ruler is placed as shown in FIG. 8 of the drawings with the left-hand corner of the ruler at the upper left corner of the divider, with the measuring edge of the ruler, disposed parallel with the joints of the instrument. The ruler is now slowly moved so as to keep the left hand corner of the ruler moving downwardly along the zero reference calibrating line designed 0 maintaining the ruler parallel with the joints or horizontal indexes at all times.

The progressive movement of the ruler is illustrated in FIG. 8 by the dotted or phantomized positions of the ruler to show that you continue to move the ruler toward the bottom of the instrument until you observe when he six inch demarcation thereon falls on the desired calibration line which for this illustrated example will be marked 40. Now, carefully move the ruler downward to the joint or horizontal index where three more rays are just included within the six inch length. This joint will provide provide the desired 43 parts; division or spaces needed and the instrument can now be folded back along that joint or horizontal index having the desired number of spaces and use as illustrated in FIG. 6 and described above, by first placing the divider adjacent the line to be divided and then marking off the spaces or divisions with a pencil or other drafting instrument.

Another problem that might be faced, is where the instrument does not have the spacing desired thereon. Thus, for example, if we wish to divide 7 inches into 24 parts with the type of instrument illustrated in FIG. 1, we are presented with a problem because the maximum spacing is 4 parts to the inch. Thus, the smallest number of spaces into which 7 inches may be divided directly as above described would be into 28 parts.

In order to use the instrument for example as illustrated in FIG. 8 of the drawings, it is necessary to use a measuring trick and this is accomplished by changing the problem so that instead of dividing the 7 inch line or space into 24 parts; we elect to divide the 7 inch line or space into 48 parts; that is, we double the number of spaces actually needed.

Since this number of spaces is readily available on the instrument, we merely follow the procedure as above set forth for the second example above utilizing the ruler once again, along the zero reference calibrating line until the 7 inch mark on the ruler falls on the calibrating line marked 48.

The instrument is then folded over at a joint or horizontal index for these number of equal spaces or divisions and the instrument is set adjacent the line or space to be divided. However, this time instead of marking off each calibration, we mark off every second calibration because we have doubled the required number of spaces. Since the markings will be only half the number of spaces on the line we will obtain the desired 24 equal spaces required.

It is believed that this simple measuring trick is equally applicable in similar multiples. Thus, if the number of equal parts needed does not appear on the instrument, it can be multiplied by three, four or perhaps even five, in order to fit the situation for the instrument. The only problem that this technique presents is that you must in accordance with the mathematical adjustment only mark off the second, third, fourth, or fifth calibrations as the case may require.

METHOD OF MANUFACTURE FOR THE EQUAL SPACE LINE DIVIDER

Because of the relative simplicity of the device above described, it is believed fundamental that it can be made by any variety of methods and three such methods are illustrated in the drawings.

OVERSIZE BLANK METHOD

Figures 10A, 10B, 10C, 10D, 10E:
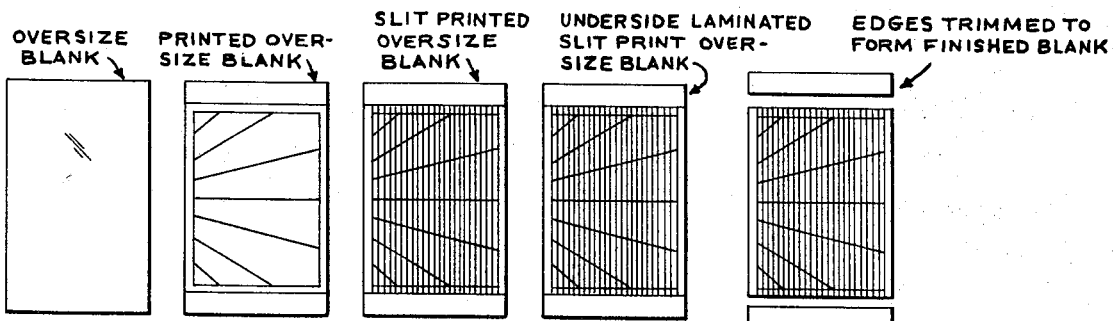
FIGS. 10a, 10b, 10c, 10d and 10e show the steps of making an instrument in accordance with the form of the invention shown in FIG. 1.

Thus, following the described steps on FIG. 10a, 10b, 10c, 10d, 10e of the drawings, the method starts as in FIG. 10a by selecting an oversized blank of relatively stiff material such as one of the stiff plastics above mentioned.

This oversized blank then has the converging lines and other indicia advantageous to the operation of the instrument printed thereon as at FIG. 10b. The converging lines being printed from a suitable origin point selected for this purpose either on the instrument or off the instrument as the case may require for the forms of the invention illustrated in FIGS. 1 and 4 of the drawing. The origin point for the converging lines will be off the instrument in the device in accordance with the FIG. 1 form of the invention and on the instrument for the FIG. 4 form of the invention.

FIG. 10b shows the oversized blank after it is printed and it will be noted that on each side of the printed section on the fact of the blank there is an extra or unprinted portion.

The extra lateral unprinted strips are important to the next step of FIG. 10c which is the cutting of the calibrating strips. This can be done in any suitable manner either by single cuts or a plurality of cuts as for example by a cutting die with a single blade or a plurality of parallel blades dependent on the tool obtainable.

However, by reference to FIG. 10c, it will be noted first that each cut is parallel to the adjacent cut to provide the desired parallel edges as above described for each respective calibration strip and second that the cuts terminate at a point inwardly of each edge or side of the oversized blank.

Since the calibration strips are not cut to the edge of the oversized blank, the blank can be handled as a single unit and can be lifted and adhesively fastened to the flexible backing strip as shown in FIG. 10b of the drawings.

In FIG. 10e, the assembled layers are trimmed to provide the working instrument as has been above described.

SIZED BLANK METHOD

Figures 11A, 11B, 11C, 11D:
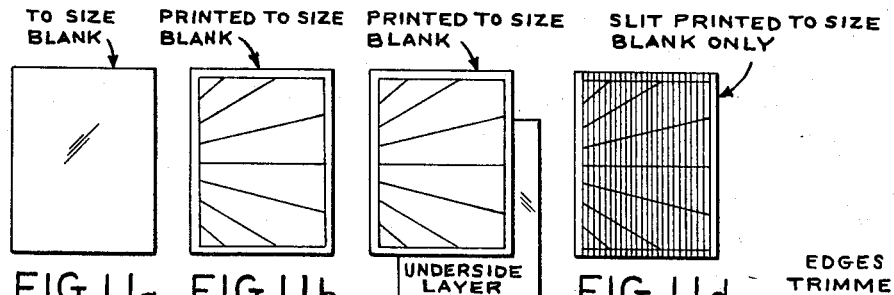
FIGS. 11a, 11b, 11c and 11d illustrate the steps of another form of making an invention in accordance with the form of the invention shown in FIG. 1 utilizing a rotary die cutter.

In the second method represented by FIGS. 11a, 11b, etc., instead of die cutting the calibration strips as illustrated above, the calibration strips are established by a rotary cutter which may have one or more blades.

In this method, therefore, instead of utilizing an oversized blank, the method starts at FIG. 11a with a blank of relatively stiff material which is cut to size.

The sized blank is printed as at FIG. 11b with the calibration lines and other indicia and then laminated or affixed to the flexible backing material as shown in FIGS. 11c and 11d of the drawings.

The assembled unit shown at FIG. 11d is now cut with the rotary die cutter which will be precisely adjusted so that the precision cutting edges will be designed to cut through the stiff printed and sized member but not the backing material to which it is attached.

Since the rotary die cutter is a precision instrument it will establish the desired parallel edges for the respective calibration strips. Once the assembled unit is cut since the blank was originally sized, no trimming is necessary and the working instrument, therefore, is provided as was above described.

INTERMEDIATE LAYER METHOD

The use of rotary die cutting may present difficulties due to the difference in tolerance or thickness of the stiff blank material utilized. Accordingly, as an alternate to this method a third method is illustrated in FIGS. 12a, 12b, 12c, etc., of the drawings.

Figures 12A, 12B, 12C, 12D, 12E, 12F:
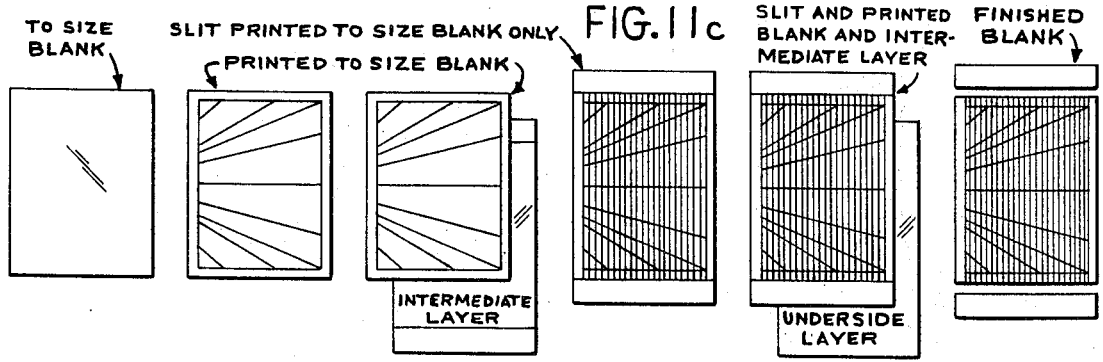
FIGS. 12a, 12b, 12c, 12d, 12e and 12f illustrate an alternate method of making the invention in accordance with the form of the invention shown in FIG. 9 wherein an intermediate layer or member is utilized.

In this last method a sized blank is once again used as the starting unit as at FIG. 12a and the blank is once again imprinted with the necessary calibration lines and other indicia as at FIG. 12b.

The printed and sized blank of relatively stiff material is then laminated to an oversized intermediate layer of flexible material having a pressure sensitive adhesive on at least one face as shown in FIG. 12c and the assembled and printed blank and intermediate flexible layer will be formed as shown in FIG. 12d of the drawings.

This intermediate unit in the formation of the working model in accordance with the present invention is then rotary die cut to provide the calibration strips as above described and also as illustrated in FIG. 12d of the drawings.

Note that the rotary die cutting will not extend to the edges or side of the oversized intermediate layer of flexible material. As a result, the intermediate unit can be lifted as a single unit and laminated to the main flexible base material, FIG. 12e and then the entire assembled unit of three layers may now be trimmed as illustrated at FIG. 12f to provide the working unit in accordance with the present invention.

It will be obvious that the intermediate unit could have adhesive on both faces of the material or alternatively, that the intermediate layer could consist of an adhesive material along which can be disposed on the back of the blank of relatively stiff material that constitutes the starting material.

Also in each of the above methods, after the step of printing the calibration lines and other indicia on the face of the instrument and before the cutting step that a further step can be introduced of laminating to the printed face of the blank of relatively stiff material a clear plastic so as to increase the durability and wearability of the instrument and to protect the printing thereon.

Thus, the above methods of fabrication provide a working instrument or equal space line divider for dividing lines of any length or spaces of any length into any number of equal parts or divisions which is relatively simple in construction and has great durability for the purposes and usages to which it will be applied.

The foregoing methods describe and illustrate how the various embodiments of the present invention can be fabricated and the various embodiments merely illustrate the inventions, the component parts of which have been shown and described. Each of the embodiments and the component parts may have substitutes which may perform a substantially similar function; such substitutes may be known as proper substitutes for the said components and may have actually been known or invented before the present invention; these substitutes are contemplated as being within the scope of the appended claims although they are not specifically catalogued herein.

Having thus, described the invention and the method of making the same, what is claimed is:

1. An equal space line divider comprising:
    (a) at least one pliable base member,
    (b) a plurality of calibrating strip means having parallel edges,
    (c) means affixing said calibrating strip means to said base member to permit each calibrating strip means to form a joint along the parallel edges thereof when said pliable base member is bent.
    (d) said calibrating strip means imprinted with calibration lines and indicia,
    (e) said calibrating lines disposed to diverge across the respective calibrating strip means from strip member to strip member and disposed a predetermined space interval from each other to provide the desired divisions of spacing at any given joint formed by the bending of the flexible base member.

2. In the device as claimed in claim 1 wherein the calibrating strips are relatively stiff and have a width in a range between 3/16" to 1/4".

3. In the device as claimed in claim 1 wherein the calibrating strips are relatively stiff and have a thickness greater than the thickness of the pliable base member.

4. In the device as claimed in claim 1 wherein the calibration strips are relatively stiff and the printed faces of the calibration strips are covered with a protective material.

5. In the device as claimed in claim 1 wherein an intermediate adhesive means is provided for affixing the calibrating strips to the pliable base member.

6. In the device as claimed in claim 1 including, a member intermediate said calibration strip means and said pliable base member, and adhesive means to permit said calibration strip means, said intermediate member and said pliable base member to be affixed together.

7. The method of making an equal space line divider consisting in the steps of:
 (a) imprinting an oversized blank of relatively stiff material with a plurality of lines diverging from a given point and wherein the diverging lines are disposed in predetermined spaced relation to each other,
 (b) cutting said blank to provide a plurality of calibration strips having edges parallel to each other and retained within the edges of said starting blank,
 (c) affixing the cut and imprinted starting blank to a pliable base member,
 (d) and trimming said joined unit of starting blank and pliable base member to the desired size.

8. The method of making an equal space line divider as claimed in claim 7 including the steps of:
 (a) affixing the cut and imprinted starting blank to a pliable intermediate member,
 (b) affixing the unit of starting blank and pliable intermediate member to a pliable base member,
 (c) and trimming said multi-part unit of starting blank, intermediate member and pliable base member to the desired size.

9. The method of making an equal space line divider as claimed in claim 7 including the step of laminating the imprinted starting blank to protect the information imprinted thereon.

10. The method of making an equal space line divider consisting in the steps of:
 (a) imprinting a sized starting blank of relatively stiff material with a plurality of lines diverging from a given point and wherein the diverging lines are disposed in predetermined spaced relation to each other,
 (b) affixing the imprinted starting blank to a pliable base member,
 (c) and cutting said starting blank to provide a plurality of calibration strips having edges parallel to each other.

References Cited

UNITED STATES PATENTS

| | | | |
|---|---|---|---|
| 1,155,059 | 9/1915 | Heathcote | 33—104 |
| 2,547,745 | 4/1951 | Cade et al. | |
| 2,589,525 | 3/1952 | Absher | 33—104 |

WILLIAM D. MARTIN, Jr., Primary Examiner

U.S. Cl. X.R.

33—104; 156—250, 277